Dec. 11, 1923.

1,477,401

L. S. WALLE

AUTOMATIC RECLOSING CIRCUIT BREAKER SYSTEM

Filed May 12, 1922    2 Sheets-Sheet 1

Inventor:
Ludwig S. Walle,
by Albert G. Davis
His Attorney.

Dec. 11, 1923.
L. S. WALLE
1,477,401
AUTOMATIC RECLOSING CIRCUIT BREAKER SYSTEM
Filed May 12, 1922   2 Sheets-Sheet 2
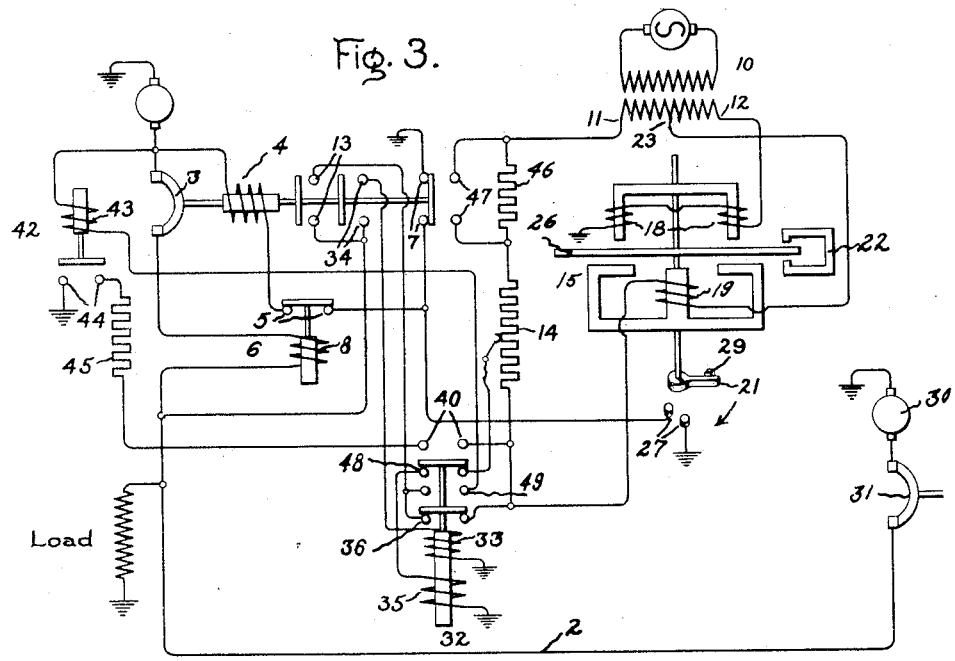
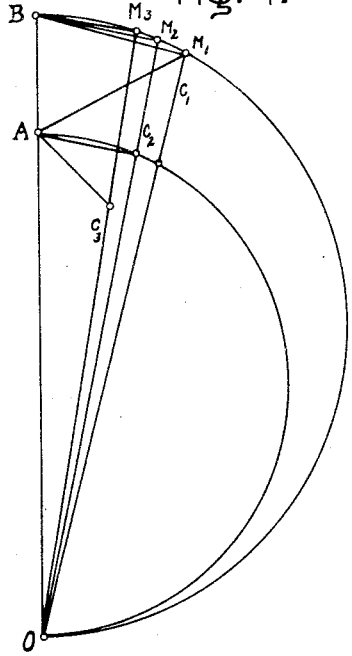
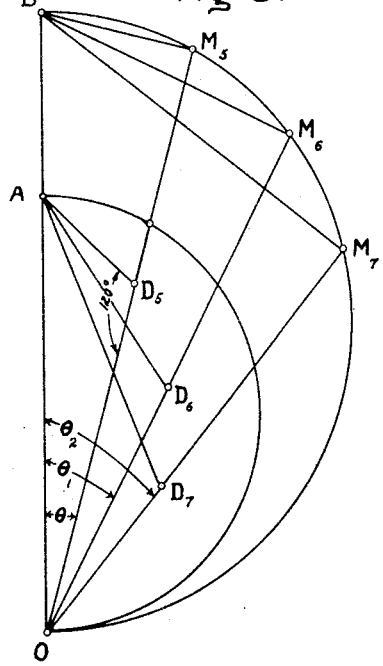
Inventor:
Ludwig S. Walle,
by
His Attorney.

Patented Dec. 11, 1923.

1,477,401

UNITED STATES PATENT OFFICE.

LUDWIG S. WALLE, OF SCOTIA, NEW YORK, ASSIGNOR TO GENERAL ELECTRIC COMPANY, A CORPORATION OF NEW YORK.

AUTOMATIC RECLOSING CIRCUIT-BREAKER SYSTEM.

Application filed May 12, 1922. Serial No. 560,459.

*To all whom it may concern:*

Be it known that I, LUDWIG S. WALLE, a citizen of the United States, residing in Scotia, in the county of Schenectady, State of New York, have invented certain new and useful Improvements in Automatic Reclosing Circuit-Breaker Systems, of which the following is a specification.

My invention relates to automatic reclosing circuit breaker systems and particularly to such systems in which the reclosing of a circuit breaker is controlled in accordance with the load resistance.

One object of my invention is to provide a new and improved arrangement of apparatus which is reliable and sensitive in its operation and relatively inexpensive.

Another object of my invention is to provide a new and an improved arrangement of apparatus for controlling the reclosing of a circuit breaker which controls the connection between a source of current and a load circuit which is supplied with current at a plurality of points whereby the circuit breaker is operative in response to different conditions depending upon the condition of the load circuit when the circuit breaker is open.

In accordance with my invention a small current is supplied to the load circuit when the circuit breaker is open and the reclosing of the circuit breaker is controlled by means of a relay which is so connected to the load circuit when the circuit breaker is open that the torque on the rotatable element of the relay reverses when the load resistance exceeds a predetermined value. Preferably in direct current systems, the small current that is supplied to the load circuit when the circuit breaker is open is alternating current.

My invention will be better understood from the following description taken in connection with the accompanying drawings, and its scope will be pointed out in the appended claims.

Figure 1:
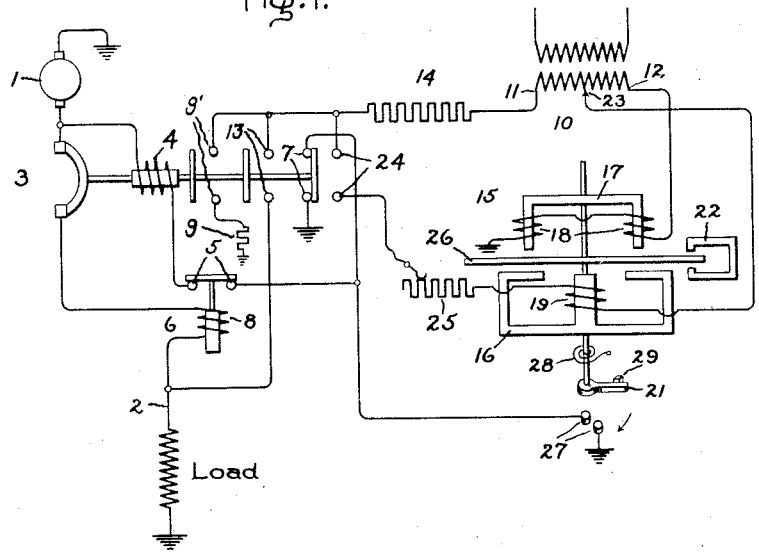
Figure 2:
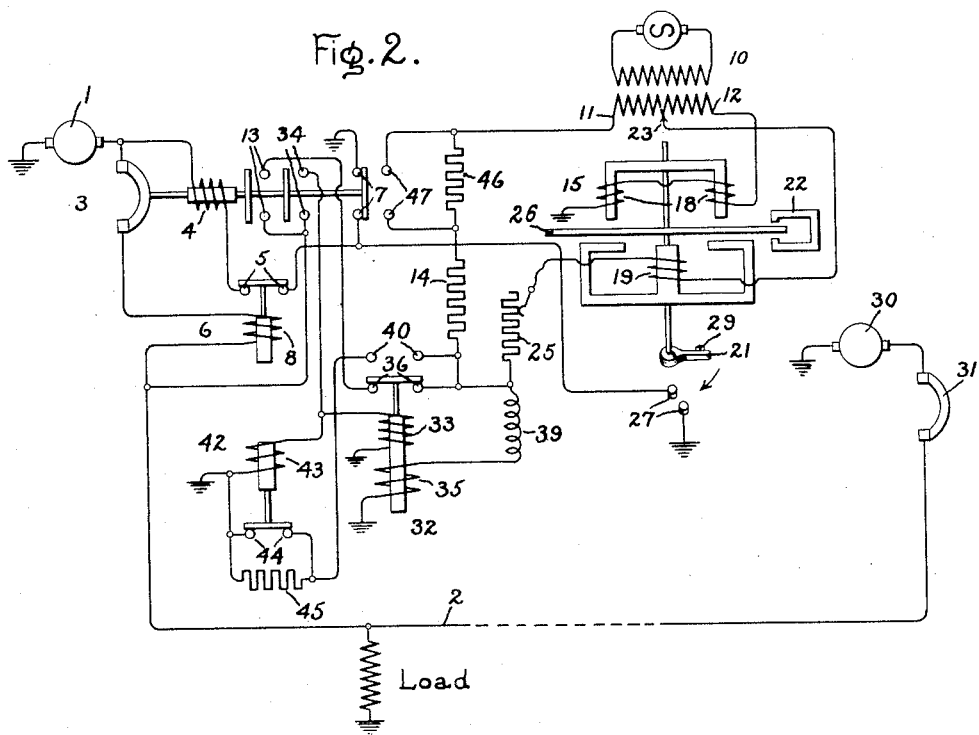

In the accompanying drawings, Fig. 1 is a diagram showing one embodiment of my invention, which is especially adapted for controlling the reclosing of a circuit breaker which controls the connection between a source of current and a load circuit which is supplied with power at one point only; Fig. 2 is a diagram showing an embodiment of my invention which is especially adapted for controlling the reclosing of a circuit breaker which controls the connection between a source of current and a load circuit which is arranged to be supplied with power at a plurality of points; Fig. 3 is a modification of the arrangement shown in Fig. 2; and Figs. 4 and 5 are vector diagrams which show the effect that variations in the load resistance have upon the operation of a power relay when connected in accordance with my invention.

Referring to Fig. 1, 1 represents a source of current, here shown as a direct current generator, which is arranged to be connected by means of a circuit breaker 3 to one side of a load circuit represented by the main 2, the other side of the load circuit being grounded. The circuit breaker 3 is provided with a closing coil 4 which, when energized, closes the circuit breaker and maintains the breaker in its closed position. My invention, however, is not limited to this particular type of breaker as it is evident that any other type may be used. When the circuit breaker is closed the coil 4 is arranged to be connected to any suitable source of current, such as the generator 1, through contacts 5 of an overload relay 6 and the auxiliary contacts 7 of the circuit breaker. The coil 8 of the overload relay 6 is connected in series with the load circuit and is so designed that the relay opens its contacts 5 only when the load current is above a predetermined value.

10 represents any suitable auxiliary source of current, preferably a low voltage alternating current source, such as the secondary winding of a transformer, having one of its terminals 11 connected to one side of the load circuit, which, in the particular arrangement shown in the drawing, is the main 2, and another terminal 12 arranged to be connected to the other side of the load circuit, which, in the particular arrangement shown in the drawing, is grounded. The connection between the main 2 and the terminal 11 includes the auxiliary contacts 13 of the circuit breaker, which are arranged to be closed when the breaker is open, and a resistor 14.

In order to control the reclosing of the circuit breaker in accordance with the conditions of the load circuit, I provide a watt responsive device 15, such as a power relay, which in this particular embodiment of my invention, is shown as being of the induction type. This power relay comprises cores 16 and 17, a current winding 18 wound on the core 17, a potential winding 19 wound on the core 16, a rotatable armature 26 mounted between the core members and to which is operatively connected a contact 21, and a retarding element 22 such as a drag magnet. The current coil 18, which is a low resistance coil, is connected in series with the auxiliary source of alternating current 10 and the load circuit when the circuit breaker 3 is open. In the particular arrangement shown the current winding 18 is connected between the terminal 12 and the grounded side of the load circuit. One end of the potential winding 19, which has a high reactance in this particular type of relay, is connected to a tap 23 on the secondary winding of the transformer between the main secondary terminals 11 and 12 and the other end is connected to a point between the terminal 11 and the main 2 so that when the load resistance is below a predetermined value, the phase relationship between the currents in the current coil 18 and the potential coil 19 is such that the torque produced is in one direction and when the load resistance is above a predetermined value the relationship between the currents is such that the torque is in the opposite direction. In the particular embodiment shown in the drawing this end of the potential coil 19 is connected to the conductor 2 of the load circuit through the auxiliary contacts 13 and 24 of the circuit breaker when the circuit breaker is open. The power relay 15 may be provided with any well known compensating means, such as a shading coil (not shown) or an adjustable resistor 25 in series with the potential winding 19 whereby the phase relationship between the voltage impressed upon the potential coil and the current flowing through it may be varied. With the connections as shown and the compensating means so adjusted that the current through the potential coil lags 90° behind the impressed voltage the resistor 14 is so designed that when the load resistance reaches a value at which the circuit breaker can be closed without overloading the generator 1 the ratio between the watts consumed in the resistor 14 and the watts consumed in the load circuit becomes greater than the ratio of the voltages between the terminals 11 and 23 and the terminals 23 and 12. As is hereinafter described, the torque on the armature 26 reverses under the above conditions so that the rotatable armature 26 moves in the direction indicated by the arrow and after a time the contact 21 connects the contacts 27 together thereby completing a circuit for the closing coil 4 to reclose the circuit breaker 3. A spring 28 tends to move the contact 21 in the opposite direction from that indicated by the arrow so that after the circuit breaker is closed the contact 21 is moved into engagement with a stop 29, thereby insuring that a certain time will always elapse between the opening and closing of the circuit breaker.

The operation of this embodiment of my invention is as follows: Under normal operating conditions the circuit breaker 3 is held closed by the energization of the closing coil 4, the circuit of which extends from the ungrounded terminal of the generator 1 through the coil 4, contacts 5 of the overload relay 6, auxiliary contacts 7 of the circuit breaker to ground. Since the auxiliary contacts 13 and 24 on the circuit breaker are open the auxiliary source of alternating current 10 is disconnected from the load circuit and the current coil 18 and the potential coil 19 of the power relay 15 are deenergized. Consequently, the spring 28 maintains the contact 21 in engagement with the stop 29 so that the contacts 27 are opened.

When an overload or short circuit occurs on the load circuit the overload relay 6 operates and opens its contacts 5 thereby opening the circuit of the closing coil 4. Circuit breaker 3 then opens and by closing its auxiliary contacts 13 and 24 connects the low voltage auxiliary source of alternating current 10 to the load circuit and completes the circuit of the potential winding 19 of the power relay 15. A small alternating current is thus supplied to the load circuit through the resistor 14 and the current winding 18 of the power relay 15. When the load resistance reaches a predetermined value the power relay 15 closes its contacts 27 thereby completing the circuit of the closing coil 4 since the overload relay closes its contacts 5 after the circuit breaker opens. This circuit extends from the ungrounded terminal of the generator 1 through coil 4, overload relay contacts 5, contacts 27 of the power relay 15 to ground. Circuit breaker 3 then closes and its auxiliary contacts 7 complete the above traced circuit for the coil 4 to maintain the breaker in its closed position. The closing of the breaker also opens the auxiliary contacts 13 and 24 so that the windings of the power relay 15 are deenergized and the auxiliary source is disconnected from the load circuit. Spring 28 then restores the contact 21 to its normal position.

The operation of the power relay will be better understood by referring to the vector diagram shown in Fig. 4, which shows the effect that variations in the load resistance have upon the direction of the power through the power relay 15 it being assumed that the current through the potential coil 19 is so small that its effect on the resistance and reactance drops of the load circuit may be neglected.

In this diagram OB represents the voltage between the terminals 11 and 12 of the transformer 10; OA represents the voltage between the terminals 11 and 23; AB the voltage between the terminals 23 and 12. OM' represents the total resistance drop of the circuit which is completed through the resistor 14 and the load circuit when the circuit breaker 3 in Fig. 1 is open, and M'B the total reactance drop of the same circuit, when the resistance of the load circuit is zero and the current limiting resistor and the load reactance have certain values. Since, under the conditions assumed, the total resistance drop of the circuit is across the resistor 14, it is evident that the resistance drop vector OC'' across the resistor 14 coincides with the vector OM'. AM', therefore, represents the voltage impressed upon the potential coil 19 of the power relay 15. The torque tending to rotate the armature 26 of the relay 15 is proportional to the product of OM'. AM' and the cosine of the angle OM'A. The coils of the relay 15 are so arranged that the torque produced by the currents through them under the above conditions is in the opposite direction from that indicated by the arrow in Fig. 1. Therefore, the contact member 21 in Fig. 1 is held in engagement with the stop 29.

Let it now be assumed that the load resistance increases to such a value that the total resistance drop of the circuit becomes $OM_2$ and the reactance drop $M_2B$, the total resistance drop $OM_2$ of the circuit now comprising the resistance drop $OC_2$ across the resistor 14 and the resistance drop $C_2M_2$ across the load resistance. $AC_2$ now represents the voltage impressed upon the potential winding 19 of the power relay 15. This vector $AC_2$ is, however, at right angles to the vector $OM_2$ so that the cosine of the angle $OC_2A$ is equal to zero. Since the torque tending to rotate the armature of the power relay is proportional to the product of $OM_2$, $AC_2$, and the cosine of the angle $OC_2A$, this torque is also zero, and therefore the spring 28 maintains the actuating member 21 in Fig. 1 in engagement with the stop 29.

It is evident that an increase in the load resistance has decreased the torque from a given value in one direction to zero. Moreover, it is also evident that since $OM_2B$ and $OC_2A$ are similar triangles, the ratio between the voltage drops $OC_2$ and $C_2M_2$ is equal to the ratio between the voltages OA and AB. Therefore, since $OC_2$ and $C_2M_2$ are proportional to the watts consumed in the resistor 14 and the load circuit, respectively, it is evident that, when there is no torque on the armature 26 of the power relay 15, the ratio between the watts consumed in the resistor 14 and the watts consumed in the load circuit is equal to the ratio between the voltages OA and AB, and is also equal to the ratio between the resistance of the resistor 14 and the resistance of the load circuit.

Let it now be assumed that the load resistance is again increased a small amount so that the total resistance drop becomes $OM_3$ and the total reactance drop $M_3B$. The total resistance drop $OM_3$ comprises the resistance drop $OC_3$ across the resistor 14 and the resistance drop $C_3M_3$ across the load resistance. $AC_3$ now represents the voltage impressed upon the coil 19. The torque tending to rotate the armature of the relay 15 is now proportional to the product of $OM_3$, $C_3A$, and the cosine of the angle $OC_3A$, and since the angle $OC_3A$ is greater than 90° this torque is in the opposite direction from the torque produced when the angle between the voltage impressed upon the potential coil and the current through the current coil is less than 90°. Consequently, the torque is in the direction indicated by the arrow in Fig. 1 and causes the armature 26 to rotate in this direction so that the contact 21 closes the contacts 27 and completes the circuit of the closing coil 4. Circuit breaker 3 then closes and its auxiliary contacts 7 complete the above-traced circuit for the coil 4 to maintain the breaker in its closed position.

Since the torque on the armature 26 of the relay 15 varies with the cosine of the angle between the voltage impressed upon the potential coil of the power relay and current through the current coil of the relay and futhermore since the amount of load resistance required to reclose the circuit breaker increases as this angle increases, it is evident that when this angle is greater than 90°, the torque on the armature 26 of the relay 15 increases with the amount of load resistance in excess of the amount required to start the armature 26 rotating in the direction indicated by the arrow in Fig. 1. Consequently, the time required for the relay to operate and close its contacts 27 varies inversely with the amount of load resistance in excess of the amount required to start the armature 26 rotating in the direction indicated by the arrow. The time that it takes for the relay to close its contacts in response to a predetermined load condition may be readily adjusted by a radial displacement of the retarding magnet 22.

From the above description, it is apparent that the coils of the relay 15 are so arranged that the circuit breaker 3 is controlled in accordance with the ratio between the voltage drop across the resistor 14 and the voltage drop across the resistance of the load circuit. Since these voltage drops are proportional to the watts consumed in the respective parts of the circuit, it is evident therefore that the relay 15 controls the reclosing of the circuit breaker in accordance with the ratio between the watts consumed in the resistor 14 and the watts consumed in the load circuit and therefore is independent of the reactance of the load circuit.

Furthermore, since the ratio between the watts consumed in the different parts of the load circuit is independent of the voltage impressed upon the load circuit and since the power required to operate the power relay is very small, it is evident that large per cent variations in the voltage produce very small per cent changes in the amount of load resistance required to cause the circuit breaker to reclose. It is also evident that since the driving torque of the relay 15 is proportional to the product of the fields produced by the current through the two coils of the relay; this relay is a very sensitive device and therefore will respond to a very small change in the load resistance.

It is a well known fact that, due to skin effect, the effective resistance of a circuit to an alternating current is greater than the resistance of the same circuit to a direct current and this is particularly true when a conductor having a large cross-section, such as a rail, is used. Furthermore, it is well known that this difference in resistance also varies with the length of the circuit. It is apparent, therefore, that if the reclosing circuit breaker arrangement above described is used in connection with a railway system in which a rail is employed as one of the main conductors, the effective resistance of the load circuit to alternating current is materially affected by the distance between the short circuit or overload and the auxiliary source of alternating current. For example, if a short circuit occurs very close to the auxiliary source, the effective resistance is substantially equal to the resistance of the circuit to direct current, whereas if there is a great distance between the point where the short circuit occurs and the auxiliary source the effective resistance of the circuit to alternating current may be very much greater than the resistance of the circuit to direct current.

Since the skin effect varies with the length of the circuit, the relay 15 in Fig. 1 will effect the closing of the circuit breaker in response to a greater resistance of the load circuit to direct current when the short circuit occurs near the alternating current source than when the distance between the alternating current source and the overload or short circuit is great. Therefore, the amount of resistance to direct current required to close the breaker varies inversely with the distance between the alternating current source and the point where the overload or short circuit occurs. It is apparent, therefore, that if the reclosing circuit breaker system is arranged to reclose the circuit breaker in response to the correct value of load resistance when the short circuit or overload occurs at a distance from the circuit breaker, the system will not reclose the breaker in response to the correct value of load resistance when the short circuit or overload occurs close to the circuit breaker.

Inasmuch as the impedance of the load circuit increases with its length, it is apparent that, since the resistor is connected in series with the load circuit, the power factor of the alternating current circuit varies with the length of the load circuit. Therefore, the power factor of the circuit at the time the ratio between the resistance of the resistor 14 and the resistances of the load circuit becomes greater than the ratio between the voltage across the terminals 11 and 23 and the voltage across the terminals 23 and 12, also varies with the distance between the auxiliary source and the overload or short circuit.

With a power relay arranged so that there is no torque produced on the rotating element thereof when the phase between the voltage impressed upon the potential coil of the relay and the current through the current coil is 90°, changes in the power factor of the alternating current circuit through the load have no effect upon the operation of the relay 15 since the ratio between the resistance of the load and the resistance of the resistor 14 is always equal to the ratio $$\frac{AB}{OA}$$

when the torque is zero. The relay will always operate to close its contacts as soon as the ratio between the effective resistance of the load circuit and the resistance of the resistor 14 is greater than the ratio between the voltage across the terminals 12 and 23 and the voltage across the terminals 23 and 11.

In the preceding description I have assumed that the power relay is designed so that its torque reverses when the impressed voltage on the potential coil is 90° out of phase with the current through the current coil. My invention is not limited, however, to such an arrangement since under certain conditions it is desirable that the torque reversal occur at a different phase angle with advantages incident thereto.

I find that if the constants of the circuits of the relay 15 are adjusted so that the torque produced on the rotating element by the currents through the coils of the relay does not reverse until the angle between the impressed voltage across the circuit of the potential coil and the current through the current coil exceeds a predetermined value, which is greater than 90°, a decrease in the power factor of the alternating current circuit through the load increases the amount of effective load resistance required to make the torque reverse. When an induction type of power relay is connected in the manner shown in Fig. 1, the amount of effective load resistance required to reverse the torque may be automatically increased as the power factor of the alternating current circuit decreases, by inserting a resistance in the circuit of the potential coil so that current through the coil lags less than 90° behind the voltage impressed thereon.

Fig. 5 shows very clearly how changes in the power factor of the alternating current circuit through the load varies the amount of effective load resistance required to reverse the torque of the power relay when it is so designed that torque on the rotating element does not reverse until the angle between the current through the current coil and the voltage impressed upon the voltage coil is greater than 120 degrees. In this figure OA, OB and AB represent the same quantities as in Fig. 4.

Let it now be assumed that in Fig. 1 a short circuit occurs so close to the circuit breaker 3 that the reactance and the skin effect of the load circuit can be neglected. Consequently the power factor of the alternating current circuit through the short circuit is unity and therefore the relay 15 will operate to close its contacts as soon as the ratio between the resistance of the load circuit and the resistance of the resistor 14 is greater than $$\frac{AB}{OA}.$$

Let it now be assumed that the distance between the point where an overload or short circuit occurs and the auxiliary source is such that the impedance of the load circuit causes the current through the load to lag $\theta$ degrees behind the voltage OB, when the torque produced on the armature 26 of the power relay is zero. Under these conditions $OM_5$ represents the total resistance drop of the circuit and $M_5B$ the reactance drop. From A a line $AD_5$ is drawn so that angle $AD_5O$ is 120° $OD_5$ then represents the voltage drop across the resistor 14 and $D_5M_5$ the voltage drop across the resistance of the load circuit when the torque on the armature 26 is zero. Therefore, under the load circuit conditions assumed the relay 15 operates to close its contacts 27 when the ratio between the watts consumed in the load circuit and the watts consumed in the resistor 14 becomes greater than the ratio $$\frac{D_5M_5}{OD_5}.$$

Since this ratio is greater than the ratio $$\frac{AB}{OA}$$

at unity power factor, it is apparent that the relay does not operate to close its contacts until the effective load resistance has increased to a larger value than when the overload occurred nearer the circuit breaker.

Similarly, if the distance between the alternating current source and the overload or short circuit is such that the current through the load circuit lags either $\theta_1$ or $\theta_2$ degrees behind the voltage OB when the torque produced on the armature of the power relay is zero, the relay closes its contacts when the ratio between the watts consumed in the load circuit and the watts consumed in the resistor 14 becomes greater than $$\frac{D_6M_6}{OD_6} \text{ and } \frac{D_7M_7}{OD_7},$$

respectively. It is evident, therefore, that the greater the distance is between the alternating current source and the overload or short circuit, the greater is the amount of effective load resistance to alternating current required to cause the power relay 15 to close its contacts.

From the above it is apparent that by properly adjusting the resistor 25 in the circuit of the potential coil of the particular type of power relay shown in Fig. 1, the skin effect may be completely or partially compensated for so that the amount of resistance to direct current in the load circuit required to cause the power relay to close its contacts remains the same or varies as the distance between alternating current source and the overload or short circuit increases.

In order to prevent the circuit breaker in Fig. 1 from remaining open in case the load should be entirely disconnected from the load circuit when the circuit breaker is open, as it is evident that the circuit through the coil 18 of the power relay 15 is open under these conditions, it is desirable to connect a high resistor 9 in parallel with the load circuit by any suitable means, such as the auxiliary contacts 9' on the circuit breaker, when the circuit breaker 3 is open so that the circuit of the circuit coil 18 remains closed whenever the circuit breaker is open. The resistance of the resistor 9 is made great so that when there is no load connected to the load circuit, the relay 15 operates to close its contacts 21, and so that it does not materially affect the operation of the relay 15 in response to the load resistance when the load resistance is less than its normal full load value.

The arrangement shown in Fig. 1 is especially adapted for stub end feed, that is for a circuit breaker which is arranged to control the connection between a load circuit and the only source of current which supplies energy thereto. This arrangement, however, cannot be used satisfactorily for multiple end feed, that is for a circuit breaker which is arranged to control the connection between a load circuit and one of a plurality of sources of current or feeders which supply energy thereto, because the direct current affects the operation of the power relay in such a way that it does not give a true indication of the load resistance when direct current is flowing through the load circuit. It is, therefore, necessary to provide means which are arranged to disconnect the auxiliary source of alternating current from the load circuit when the load circuit is being supplied with direct current while the circuit breaker is open, and to control the reclosing of the circuit breaker in response to some other condition of the load circuit when the circuit breaker is open and the auxiliary source is disconnected therefrom.

Fig. 2, which is a modification of the embodiment shown in Fig. 1, shows an arrangement embodying my invention which is especially adapted for multiple end feed systems. In this modification, the load circuit is arranged to be supplied from another main source of direct current 30 which may be connected to the load circuit by any suitable switching means, such as a circuit breaker 31, which may be either automatically or manually controlled. It is obvious that the source 30 may be either a separate source as shown or one of a plurality of feeders supplied from the generator 1.

In order to control the connection between the auxiliary source of alternating current 10, the voltage of which is low compared with the normal direct current voltage, and the load circuit when the circuit breaker 3 is open so that the auxiliary source 10 is disconnected from the load circuit when the latter is supplied with direct current from the source 30, I provide a relay 32 which, when operated, disconnects the auxiliary source from the load circuit. This relay is provided with a high resistance holding winding 33 which is arranged to be connected across the load circuit through the auxiliary contacts 34 of the circuit breaker, when the latter is open, and a low resistance operating winding 35 which is arranged to be permanently connected in series with the resistor 14 across the auxiliary source 10. The reactance of the circuit of the coil 35 is made great enough so that the alternating current through the coil of the relay 32 is not sufficient to operate the relay and cause it to open its contacts 36 through which the auxiliary source is connected to the load circuit or to maintain the relay in its operated position when the coil 33 is deenergized. The resistance of the coil 35, however, is such that when the direct current voltage across the load circuit is above a predetermined value, the coil is sufficiently energized by the direct current through it to operate the relay thereby disconnecting the auxiliary source from the load circuit. It may be desirable in some cases to connect a high reactance coil 39 in series with the coil 35 to increase the reactance of the circuit. The high reactance of the coil 39 also tends to delay the building up of the direct current through the coil 35, and thereby prevent an excessive current from flowing through the coil 35 in case normal direct current voltage is suddenly impressed upon the load circuit while the circuit breaker 3 is open and the contacts 36 of the relay 32 are closed. The coil 33 is so designed that it cannot pick up the relay, but is arranged to maintain it in its operated position after it has been moved into this position by the coil 35.

In order to prevent the power relay 15 from closing its contacts 27 when the relay 32 operates to disconnect the auxiliary source from the load circuit, since the coil 35 is still connected in series with resistor 14, reactance coil 39 and the current coil 18 of the power relay across the terminals 11 and 12 of the auxiliary source 10, and the resistance of the coil 35 is great enough to cause the relay to close its contacts 27, a low resistance circuit is arranged to be completed in parallel with the winding 35 when the relay 32 operates so that the watts consumed in this low resistance circuit and the coil 35 are not sufficient to cause the relay 15 to close its contacts 27. As shown in this modification of my invention, the relay 32 is provided with contacts 40 which are adapted to be closed when the relay moves into its operated position. The closing of these contacts completes a low resistance circuit between the resister 14 and ground. Consequently, the torque produced by the currents in the windings 18 and 19 of the power relay 15 is in the same direction as when the auxiliary source is supplying alternating current to a short circuit on the load circuit, and, thereof, the relay 15 remains in its open position.

Any suitable means may be provided for reclosing the circuit breaker 3 when the load circuit is supplied with direct current from some other main source and the load conditions are such that the circuit breaker can be closed without an overload being connected to the generator 1. As shown in this modification of my invention, this result is obtained by the voltage relay 42, the operating coil 43 of which is arranged to be connected across the load circuit by means of the auxiliary contacts 34 when the circuit breaker 3 is open. This relay is so designed that it opens its contacts 44 and thereby inserts a resistor 45 in the low resistance circuit between the resistor 14 and ground through contacts 40 of the relay 32 so as to change the direction of the torque produced by the currents in the windings 18 and 19. The power relay 15 then operates to close its contacts 27, thereby completing the closing circuit of the circuit breaker.

Instead of using a spring 28 to restore the power relay to its open position when the circuit breaker 3 closes, this result is obtained in this modification by means of a resistor 46, which is arranged to be connected in series with the resistor 14 when the circuit breaker closes. This resistor 46 is so designed that when the circuit breaker is closed, the ratio between the watts consumed in the resistors 14 and 46 and the watts consumed in the winding 35 is such that the torque produced by the currents in the windings 18 and 19 is in the opposite direction from that indicated by the arrow, so that the device is moved to its open position. The resistor 46 is arranged to be short circuited by the auxiliary contacts 47 when the circuit breaker 3 is open.

The operation of the modification shown in Fig. 2 is as follows: Let it be assumed that the load conditions are normal and the circuit breakers 3 and 31 are closed. Circuit breaker 3 is held in its closed position by the energization of the closing coil 4, the circuit of which extends from the ungrounded terminal of the generator 1 through the coil 4, contacts 5 of the overload relay 6, auxiliary contacts 7 on the circuit breaker to the grounded terminal of the generator 1. Since the auxiliary contacts 13, 34 and 47 on the circuit breaker are open when the circuit breaker is closed, the auxiliary source of alternating current 10 is disconnected from the load circuit and the coils 33 and 43 of the relays 32 and 42, respectively, are denergized. A circuit, however, is completed from the main terminal 11 of the auxiliary source of alternating current 10 through the resistors 46 and 14 and from this point one branch extends through the potential coil 19 of the power relay 15 to the auxiliary terminal 23 of the auxiliary source of alternating current 10 and another branch extends through the reactance coil 39, operating coil 35 of the relay 32, ground current coil 18 of the power relay 15 to the main terminal 12 of the auxiliary source of alternating current. Since the impedance of the latter branch is high, the current through it is not great enough to operate the relay 32. Furthermore, the resistance of the reactance coil 39 the coil 35 and the current coil 18 of the power relay 15 is so small, compared to the resistance of the resistors 14 and 46, that the torque produced by the currents through the coils 18 and 19 of the power relay 15 is in the direction opposite from that indicated by the arrow. Consequently, the contact 21 of the power relay remains in engagement with the stop 29.

As long as the load conditions are normal, the contacts 5 of the overload relay 6 remain closed. When an overload or short circuit occurs on the load circuit, so that the current through the overload coil 8 is sufficient to cause the relay 6 to open its contacts, the operating coil 4 of the circuit breaker becomes deenergized and the circuit breaker 3 opens. In opening, the circuit breaker opens its auxiliary contacts 7 and closes its auxiliary contacts 13, 34 and 47. The closing of the contact 34 connects the coils 33 and 43 of the relays 32 and 42, respectively, across the load circuit, the closing of the contacts 13 connects the contacts 36 of the relay 32 to the main 2 of the load circuit so that the load circuit is connected to the main terminals of the auxiliary source of alternating current; and the closing of contacts 47 short circuits the resistor 46. Since the impedance of the load circuit is very much less than the impedance of the reactance coil 39 and the coil 35 and of the coils 33 and 43 which are connected in parallel with the load circuit most of the small alternating current through the resistor 14 flows through the load circuit.

If the overload or short circuit causes all of the other circuit breakers in the system to open, the direct current voltage across the load circuit drops to zero so that the relays 32 and 42 do not operate to open their contacts 36 and 44, respectively. The operation of the reclosing equipment under these conditions is the same as above described in connection with the embodiment shown in Fig. 1. So long as the load resistance is below a predetermined value the torque on the armature 26 of the power relay 15 is in the direction opposite from that indicated by the arrow.

When the load resistance reaches a predetermined value, the direction of the torque reverses so that it is in the direction indicated by the arrow. The contact 21 then moves in the direction indicated by the arrow and after a time interval, which varies inversely with the difference between the actual load resistance and the predetermined amount of load resistance required to cause the torque of the power relay to reverse, the contact 21 closes the contacts 27. Coil 4 of the circuit breaker 3 then becomes energized and closes the breaker. The circuit breaker in closing opens its auxiliary contacts 13, 34 and 47 and closes its auxiliary contact 7 thereby restoring the reclosing equipment to its normal condition.

If the short circuit or overload does not open all of the other circuit breakers at the same time that the circuit breaker 3 opens, the direct current voltage which is impressed across the load circuit by the sources connected thereto effects the operation of the power relay 15 in such a way that the contact 21 remains in engagement with the stop 29, even though the load resistance increases above the predetermined value which normally causes the power relay to close its contacts 27. The exact reason why the direct current effects the operation of the power relay in this manner is not fully understood at the present time, but it is believed that it is due to saturation of the iron in the magnetic circuits of the power relay produced by the direct current flowing through the coils 18 and 19. This feature, however, is a very important one since it allows the power relay to close the circuit breaker in response to the load resistance, when the auxiliary source of alternating current is connected to the load circuit, only when there is no appreciable direct current voltage across the load circuit. Therefore, it enables the circuit breaker to be reclosed in response to one condition when the load circuit is not supplied from some other source of direct current and in response to another condition when the load circuit is supplied from another direct current source.

In order to protect the low voltage source 10 and the other apparatus from damage, due to a high direct current voltage being impressed thereon, the operating winding 35 of the relay 32 is arranged to operate the relay when the direct current voltage across the load circuit is above a predetermined low value. Relay 32, in operating, opens its contacts 36 thereby disconnecting the auxiliary source 10 and the operating winding 35 from across the load circuit and closes its contacts 40 thereby completing a low resistance circuit around the coil 35 so that the power relay 15 remains in its open position. Although the operating coil 35 of the relay 32 is disconnected from the load circuit, the holding coil 33 remains connected across the load circuit and receives sufficient direct current to hold the relay in its operated position.

Since the direct current voltage may be suddenly restored to its normal value, it is desirable that the relay 32 open its contacts very quickly, when the direct current voltage exceeds the predetermined value, so that an excessive current cannot flow through the auxiliary source 10. It is preferable, therefore, to arrange the windings 33 and 35 so that they aid each other.

As long as the load resistance remains below a predetermined value the direct current voltage across the load circuit it not sufficient to operate the relay 42. When the direct current voltage across the load circuit exceeds a predetermined value, which indicates that the resistance of the load circuit is above a predetermined value, relay 42 operates and inserts the resistor 45 in the low resistance circuit around the coil 35 so that the ratio between the resistances of the resistors 14 and the resistances of the resistor 45, the coil 35 and current coil 18 of the power relay is such that the contact 21 is moved in the direction indicated by the arrow and closes the contacts 27. The above traced circuit of the operating coil 4 of the circuit breaker is thereby completed and the circuit breaker 3 is closed. The circuit breaker, in closing, completes the above traced holding circuit of the coil 4 through the auxiliary contacts 7 and opens its auxiliary contacts 13, 34 and 47 so that the coils 33 and 43 of the relays 32 and 42, respectively are deenergized and the resistor 46 is connected in series with the resistor 14. Consequently relays 32 and 42 and the power relay 15 are restored to their normal positions by the closing of the circuit breaker.

The arrangement shown in Fig. 3 is a modification of the arrangement shown in Fig. 2. In this modification, the reactance coil 39 is omitted and the operating coil 35 of the relay 32 is connected to a tap on the resistor 14 so that a portion of the resistor 14 tends to limit the direct current through the low resistance coil 35. The relay 32 is also provided with the contacts 48 in the circuit of coil 35 so that the terminal 11 of the auxiliary source is entirely disconnected from ground when the relay 32 is operated. Consequently, no current flows through the series winding 18 of the power relay 15 and therefore there is no torque on the armature 26 of the power relay 15, and the contact 21 remains in engagement with the stop 29.

In this modification the coil 43 of the relay 42, which depends upon the direct current voltage of the load circuit for controlling the reclosing of the circuit breaker under multiple feed conditions, is connected across the terminals of circuit breaker 3 through contacts 49 of the relay 32 instead of directly across the load circuit as shown in Fig. 2. Consequently, the resistor 45 is connected in series with the contacts 44 of the relay 42 instead of in parallel with the contacts as in Fig. 2. Under normal load conditions the circuit breaker 3 is held in its closed position by the energization of the coil 4. A circuit is also completed from terminal 11 of the alternating current source 10 through a portion of the resistor 14, contacts 48 of the relay 32 which is in its normal position, coil 35 of the relay 32, ground, current coil 18 of the relay 15 to the other main terminal 12 of the alternating current source. The potential coil 19 is connected between the auxiliary terminal 23 and a tap on the resistor 14, which in the particular modification shown in Fig. 3 is the end connected to the contact 36. The ratio between the resistances of the coil 35 and the resistances of the resistor 46 and the portion of the resistor 14 in series with the coil 35 is such that the torque on the armature 26 of the power relay 15 is in the opposite direction from that indicated by the arrow. Contact 21, therefore, is in engagement with the stop 29.

Since the operation of this modification of my invention differs from the arrangement shown in Fig. 2 only when the circuit breaker is open and the load circuit is supplied with direct current, it is believed that only a brief description of the reclosing operation under this condition is required.

When the circuit breaker 3 is opened and the direct current voltage across the load circuit is above a predetermined value, due to some other main source of direct current, such as the generator 30, being connected to the load circuit, the relay 32 operates to disconnect the auxiliary source 10 from the load circuit as in Fig. 2. In addition, it also opens its contacts 48 thereby disconnecting the winding 35 from the terminal 11 of the auxiliary source so that the circuit through the series coil 18 of the power relay 15 is interrupted. Consequently, there is no torque produced on the armature 26 of the power relay 15 and therefore the contact 21 remains in engagement with the stop 29.

The relay 32 also closes its contacts 48 so that coil 43 of the relay 42 becomes sufficiently energized to open its contacts 44 immediately. Therefore, the circuit completed by the closing of the contacts 40 by the relay 32 is immediately opened so that the relay 15 does not have time to operate and close its contacts 27. As long as the voltage across the terminals of the circuit breaker is above a predetermined value the contacts 44 of the relay 42 remain open. When, however, the voltage across the load circuit reaches a predetermined value so that the difference between the voltage of the generator 1 and the voltage across the load circuit is less than a predetermined value, the relay 42 closes its contacts 44 and completes a circuit from ground through the series coil 18 of the power relay 15, auxiliary source 10, auxiliary contacts 47 of the circuit breaker, resistor 14, contacts 40 of the relay 32, resistor 45, contacts 44 of the relay 42 to ground. The resistor 45 is so designed that the ratio between the resistances of the resistors 14 and 45 is such that the torque produced on the armature 26 of the power relay 15 is in the direction indicated by the arrow. The contact 21 of the power relay then moves in the direction indicated by the arrow and closes the contacts 26. The circuit of the operating coil 4 of the circuit breaker 3 is then completed and the circuit breaker is closed. The circuit breaker in closing completes a holding circuit for the closing coil through its auxiliary contacts 7 and opens its auxiliary contacts 13 and 47 so that the coil 33 of the relay is deenergized and the resistor 46 is connected in series with the resistor 14. The deenergization of coil 33 causes the relay 32 to return to its normal position thereby opening its contacts 40 and closing its contacts 48 so that relay 15 is restored to its normal position automatically. The closing of the circuit breaker 3 short circuits the coil 43 of the relay 42 so that its contacts 44 remain closed, but since the contacts 40 of the relay 32 are open, the circuit through the contacts 44 is open.

While I have shown and described several embodiments of my invention I do not desire to be limited to the exact arrangements shown but seek to cover in the appended claims all those modifications that fall within the true spirit and scope of my invention.

What I claim as new and desire to secure by Letters Patent of the United States, is:—

1. In an automatic reclosing circuit breaker system, the combination with a load circuit, a supply circuit, a circuit breaker for connecting said circuits together, and closing means for said circuit breaker, of an impedance, a third circuit including said impedance and said load circuit arranged to be completed when said circuit breaker is open, and a relay arranged to control said closing means having a current coil energized in accordance with the current in said third circuit, and a potential coil connected to said third circuit so that the torque produced by the currents in said coils is in a predetermined direction only when the load resistance is above a predetermined value relative to the resistance in another portion of said third circuit.

2. In an automatic reclosing circuit breaker system, the combination with a load circuit, a supply circuit, a circuit breaker for connecting said circuits together, and closing means for said circuit breaker, of an impedance, a third circuit including said impedance and said load circuit arranged to be completed when said circuit breaker is open, a relay arranged to control said closing means, said relay comprising a movable element, a current coil connected in said third circuit and a potential coil connected to said third circuit so that said element tends to move in one direction when the load resistance is above a predetermined value and tends to move in the opposite direction when the load resistance is below said predetermined value, and a circuit for said closing means arranged to be completed by said movable element.

3. In an automatic reclosing circuit breaker system, the combination with a load circuit, a supply circuit arranged to be connected to said load circuit, a circuit breaker for connecting said circuits together, and closing means for said circuit breaker, of an auxiliary source of alternating current arranged to be connected to said load circuit when said circuit breaker is open, an impedance arranged to be connected in series with said auxiliary source and said load circuit, and a power relay arranged to control said closing means having a current coil in series with said auxiliary source, impedance and load circuit and a potential coil connected to said auxiliary source and said impedance so that the currents through said coils produce a torque in a predetermined direction to effect the operation of said closing means only when the load resistance is above a predetermined value relative to the resistance of said impedance.

4. In an automatic reclosing circuit breaker system, the combination with a load circuit, a supply circuit arranged to be connected to said load circuit, a circuit breaker for connecting said circuits together, and closing means for said circuit breaker, of an auxiliary source of alternating current arranged to be connected to said load circuit when said circuit breaker is open, an impedance arranged to be connected in series with said auxiliary source and said load circuit, and means arranged to be operated in response to a predetermined ratio between the watts consumed in one portion of the circuit which is connected to said auxiliary source when the circuit breaker is open and the watts consumed in another portion of said circuit to control said closing means.

5. In an automatic reclosing circuit breaker system, the combination with a load circuit, a supply circuit arranged to be connected to said load circuit, a circuit breaker for connecting said circuits together, and closing means for said circuit breaker, of an auxiliary source of alternating current arranged to be connected to said load circuit when said circuit breaker is open, an impedance arranged to be connected in series with said auxiliary source and said load circuit, and means arranged to be operated in response to a predetermined ratio between the watts consumed in said impedance and the watts consumed in said load circuit when said auxiliary source is connected thereto to control said closing means.

6. In an automatic reclosing circuit breaker system, the combination with a load circuit, a supply circuit, a circuit breaker for connecting said circuits together, and closing means for said circuit breaker, of an alternating current transformer having two main secondary terminals, an impedance, a circuit including said impedance and said load circuit and arranged to be connected to the main secondary terminals of said transformer when said circuit breaker is open, and a power relay arranged to control said closing means, said relay comprising a current coil arranged to be energized in accordance with the current supplied to said load circuit from said transformer when said circuit breaker is open and a potential coil having one end connected to the secondary winding of said transformer at a point between said main secondary terminals and its other end connected to such a point in the circuit which is completed when the circuit breaker is open that the voltage impressed thereon varies in accordance with the load resistance.

7. In an automatic reclosing circuit breaker system, the combination with a load circuit, a supply circuit, a circuit breaker for connecting said circuits together, closing means for said circuit breaker, and a circuit for said closing means, of an alternating current transformer having two main secondary terminals, an impedance, a circuit including said impedance and said load circuit arranged to be connected to said main secondary terminals when said circuit breaker is open, and a contact making induction type watt relay arranged to control the circuit of said closing means comprising a current coil connected in series with said impedance and said load circuit when the circuit breaker is open and a high reactance potential coil having one end connected to a point on the secondary winding of said transformer between said main terminals and its other end connected to a point between said impedance and the load circuit.

8. In an automatic reclosing circuit breaker system, the combination with a direct current load circuit, a source of direct current, a circuit breaker arranged to connect said source to said load circuit and closing means for said circuit breaker, of an auxiliary source of alternating current arranged to be connected to said load circuit when said circuit breaker is open, an impedance arranged to be connected in series with said auxiliary source and said load circuit, and a time power relay for controlling the operation of said closing means arranged to be operated in response to a predetermined ratio between the watts consumed in said impedance and the watts consumed in said load circuit.

9. In an automatic reclosing circuit breaker system, the combination with a load circuit, a supply circuit, a circuit breaker for connecting said circuits together, closing means for said circuit breaker, and a circuit for said closing means, of a resistor, a third circuit including said resistor and said load circuit arranged to be completed when said circuit breaker is open, a power relay for controlling the operation of said closing means comprising a movable element arranged to be moved in a predetermined direction to effect the completion of the circuit of said closing means, a current coil connected in series with said third circuit, and a potential coil connected to said third circuit so that the currents through said coils produce a torque in a direction to cause said movable element to effect the closing of the circuit of said closing means only when the load resistance is above a predetermined valve, and a circuit including said resistor and the coils of said power relay arranged to be completed when said circuit breaker is closed to cause the currents through said coils to produce a torque which tends to move the movable element in the opposite direction from that in which it moves to effect the completion of the circuit of said closing coil.

10. In an automatic reclosing circuit breaker system, the combination with a load circuit, a supply circuit a circuit breaker for connecting said circuits together, closing means for said circuit breaker, and a circuit for said closing means, of an auxiliary source of alternating current, means for connecting said auxiliary source to said load circuit when said circuit breaker is open, a resistor arranged to be connected in series with auxiliary source and said load circuit, a power relay for controlling the operation of said closing means comprising a movable element arranged to be moved in a predetermined direction to effect the completion of the circuit of said closing means, a current coil in series with said auxiliary source and said load circuit, and a potential coil connected to said auxiliary source and said resistance so that the currents through said coils produce a torque in a direction to cause said movable element to effect the closing of the circuit of said closing means only when the load resistance is above a predetermined value, and a circuit including said auxiliary source, said resistance and the coils of said power relay arranged to be completed when said circuit breaker is closed to cause the currents through said coils to produce a torque which tends to move the movable element in the opposite direction from that in which it moves to effect the completion of the circuit of said closing means.

11. In an automatic reclosing circuit breaker system, the combination with a load circuit, a direct current supply circuit, a circuit breaker for connecting said circuits together and closing means for said circuit breaker, of a source of alternating current having two main terminals and an auxiliary terminal, means for connecting said load circuit across the main terminals of said alternating current source when the circuit breaker is open, a resistor arranged to be connected between one side of said load circuit and one of the main terminals of said alternating current source, and a power relay for controlling said closing means comprising a current coil connected between one side of said load circuit and one of the main terminals of said alternating current source, and a potential coil connected between said auxiliary terminal of said alternating source and the connection between said resistor and the load circuit.

12. In an automatic reclosing circuit breaker system, the combination with a direct current load circuit, arranged to be supplied with current at a plurality of points, a direct current supply circuit, a circuit breaker for connecting said circuits together, and closing means for said circuit breaker, of a source of alternating current having two main terminals and an auxiliary terminal, means for connecting said load circuit across the main terminals of said alternating current source when the circuit breaker is open, a resistor arranged to be connected between one side of said load circuit and one of the main terminals of said alternating current source, a power relay for controlling said closing means comprising a current coil connected between one side of said load circuit and one of the main terminals of said alternating current source, and a potential coil connected between said auxiliary terminal of said alternating source and the connection between said resistor and the load circuit, and means arranged to interrupt the connection between one main terminal of said alternating current source and one side of said load circuit when the direct current voltage across said load circuit is above a predetermined value.

13. In an automatic reclosing circuit breaker system, the combination with a direct current load circuit, arranged to be supplied with current at a plurality of points, a direct current supply circuit, a circuit breaker for connecting said circuits together, and closing means for said circuit breaker, of a source of alternating current having two main terminals and an auxiliary terminal, means for connecting said load circuit across the main terminals of said alternating current source when the circuit breaker is open, a resistor arranged to be connected between one side of said load circuit and one of the main terminals of said alternating current source, a power relay for controlling said closing means comprising a current coil connected between one side of said load circuit and one of the main terminals of said alternating current source, and a potential coil connected between said auxiliary terminal of said alternating source and the connection between said resistor and the load circuit, means arranged to interrupt the connection between one main terminal of said alternating current source and one side of said load circuit when the direct current voltage across said load circuit is above a predetermined value, and means controlled by the direct current voltage across said load circuit adapted to complete a high resistance circuit around the interruption produced by said last mentioned means.

14. In an automatic reclosing circuit breaker system, the combination with a direct current load circuit, arranged to be supplied with current at a plurality of points, a direct current supply circuit, a circuit breaker for connecting said circuits together, and closing means for said circuit breaker, of a source of alternating current having two main terminals and an auxiliary terminal, means for connecting said load circuit across the main terminals of said alternating current source when the circuit breaker is open, a resistor arranged to be connected between one side of said load circuit and one of the main terminals of said alternating current source, a power relay for controlling said closing means comprising a current coil connected between the main terminal of the source of alternating current and the side of the load circuit between which the resistor is not connected and a potential coil connected between said auxiliary terminal of said source of alternating current and the connection between said resistor and the load circuit, and means arranged to interrupt the connection between said resistor and said load circuit when the direct current voltage across said load is above a predetermined value.

15. In an automatic reclosing circuit breaker system, a direct current load circuit adapted to be supplied with current at a plurality of points, a source of direct current, a circuit breaker adapted to connect said source to said load circuit, and closing means for said circuit breaker, of an auxiliary source of alternating current arranged to be connected to said load circuit when said circuit breaker is open, means adapted to be controlled by the load resistance when said auxiliary source is connected to said load circuit to effect the operation of said closing means to close said breaker, an electromagnet adapted to effect the disconnection of said auxiliary source from said load circuit when the circuit breaker is open and the direct current voltage across the load circuit is above a predetermined value, a circuit for said electromagnet, and contacts in the circuit of said electromagnet controlled by said circuit breaker so as to effect the deenergization of said electromagnet when the circuit breaker is closed.

16. In an automatic reclosing circuit breaker system, a direct current load circuit adapted to be supplied with current at a plurality of points, a source of direct current, a circuit breaker adapted to connect said source to said load circuit, and closing means for said circuit breaker, of an auxiliary source of alternating current arranged to be connected to said load circuit when said circuit breaker is open, means adapted to be controlled by the load resistance when said auxiliary source is connected to said load circuit to effect the operation of said closing means to close said breaker, an electromagnet adapted to effect the disconnection of said auxiliary source from said load circuit when the circuit breaker is open and the direct current voltage across the load circuit is above a predetermined value, comprising an operating winding arranged to be connected across said load circuit when said circuit breaker is open and said electromagnet is in its normal position, and a high resistance holding winding arranged to be connected across said local circuit when said circuit breaker is open to maintain said electromagnet in its operated position.

17. In an automatic reclosing circuit breaker system, a direct current load circuit adapted to be supplied with current at a plurality of points, a source of direct current, a circuit breaker adapted to connect said source to said load circuit, and closing means for said circuit breaker, of an auxiliary source of alternating current arranged to be connected to said load circuit when said circuit breaker is open, means adapted to be controlled by the load resistance when said auxiliary source is connected to said load circuit to effect the operation of said closing means to close said breaker, an electromagnet comprising a low resistance operating winding arranged to be connected across said load circuit when said auxiliary source is connected thereto to effect the operation of said electromagnet to disconnect said auxiliary source from said load circuit when the direct current voltage across said load circuit is above a predetermined value, a high resistance holding winding arranged to be controlled by the voltage across said load circuit to maintain said electromagnet in its operated position, circuits for said windings and contacts in the circuit of said operating winding arranged to be controlled by said electromagnet to effect the deenergization of said low resistance winding when the direct current voltage is above a predetermined value and the circuit breaker is open.

18. In an automatic reclosing circuit breaker system, the combination with a direct current load circuit arranged to be supplied with current at a plurality of points, a direct current supply circuit, a circuit breaker for connecting said circuits together, and closing means for said circuit breaker, of a source of alternating current having two main terminals and an auxiliary terminal, a resistor, a third circuit including said resistor and said load circuit arranged to be connected across the main terminals of said alternating current source when the circuit breaker is open, a power relay for controlling said closing means comprising a current coil connected in series with said third circuit and a potential coil connected between the auxiliary terminal of said source of alternating current and the connection between said resistor and the load circuit, and an electromagnet for opening said third circuit comprising contacts in said third circuit, a low resistance operatng coil connected in shunt around a portion of said second resistor and said load circuit, and a high resistance winding connected directly across said load circuit when the circuit breaker is open.

19. In an automatic reclosing circuit breaker system, the combination with a direct current load circuit arranged to be supplied with current at a plurality of points, a direct current supply circuit, a circuit breaker for connecting said circuits together, and closing means for said circuit breaker, of a source of alternating current having two main terminals and an auxiliary terminal, a resistor, means arranged to short circuit said resistor when the circuit breaker is open, a second resistor, a third circuit including said resistors and said load circuit arranged to be connected across the main terminals of said alternating current source when the circuit breaker is open, and a power relay for controlling said closing means comprising a current coil connected in series with said third circuit and a potential coil connected in series with said resistors between said auxiliary terminal and one of the main terminals of said alternating current source.

20. In an automatic reclosing circuit breaker system, the combination with a direct current load circuit arranged to be supplied with current at a plurality of points, a direct current supply circuit, a circuit breaker for connecting said circuits together, and closing means for said circuit breaker, of a source of alternating current having two main terminals and an auxiliary terminal, a resistor, means arranged to short circuit said resistor when the circuit breaker is open, a second resistor, a third circuit including said second resistor and said load circuit arranged to be connected across the main terminals of said alternating current source when the circuit breaker is open, a power relay for controlling said closing means comprising a current coil connected in series with said third circuit and a potential coil connected in series with said resistors between said auxiliary terminal and one of the main terminals of said alternating current source, and an electromagnet comprising contacts in said third circuit arranged to be opened when the direct current voltage across the load circuit exceeds a predetermined value, a low resistance operating coil connected in shunt around a portion of said second resistor and the load circuit, contacts in said shunt connection arranged to be opened by said electromagnet and a high resistance holding winding arranged to be connected directly across the load circuit when the circuit breaker is open.

21. In an automatic reclosing circuit breaker system, the combination with a direct current load circuit arranged to be supplied with current at a plurality of points, a direct current supply circuit, a circuit breaker for connecting said circuits together, and closing means for said circuit breaker, of a source of alternating current having two main terminals and an auxiliary terminal, a resistor, means for short circuiting said resistor when the circuit breaker is open, a second resistor, a power relay having a current coil connected between one of the terminals of said source of alternating current and one side of the load circuit and a potential coil connected in series with said resistors between the other main terminal of said source of alternating current and the auxiliary terminal, means for completing a circuit between said second resistor and the side of the load circuit which is not connected to the current coil of the power relay when said circuit breaker is open, an electromagnet comprising contacts in said last mentioned circuit, a low resistance operating coil connected in shunt around a portion of said second resistor and the load circuit, contacts in said shunt connection arranged to be opened by said electromagnet when said first mentioned contacts are opened, and a high resistance holding winding arranged to be connected directly across the load circuit when the circuit breaker is open, and means adapted to be controlled by the voltage across the load circuit to complete a circuit between a said second resistor and said current coil to cause said power relay to effect the closing of said closing means.

In witness whereof, I have hereunto set my hand this 9th day of May, 1922.

LUDWIG S. WALLE.